Jan. 9, 1934.   W. F. SMITH   1,942,669
FREE WHEELING TRANSMISSION CLUTCH
Filed Aug. 24, 1931   3 Sheets-Sheet 1
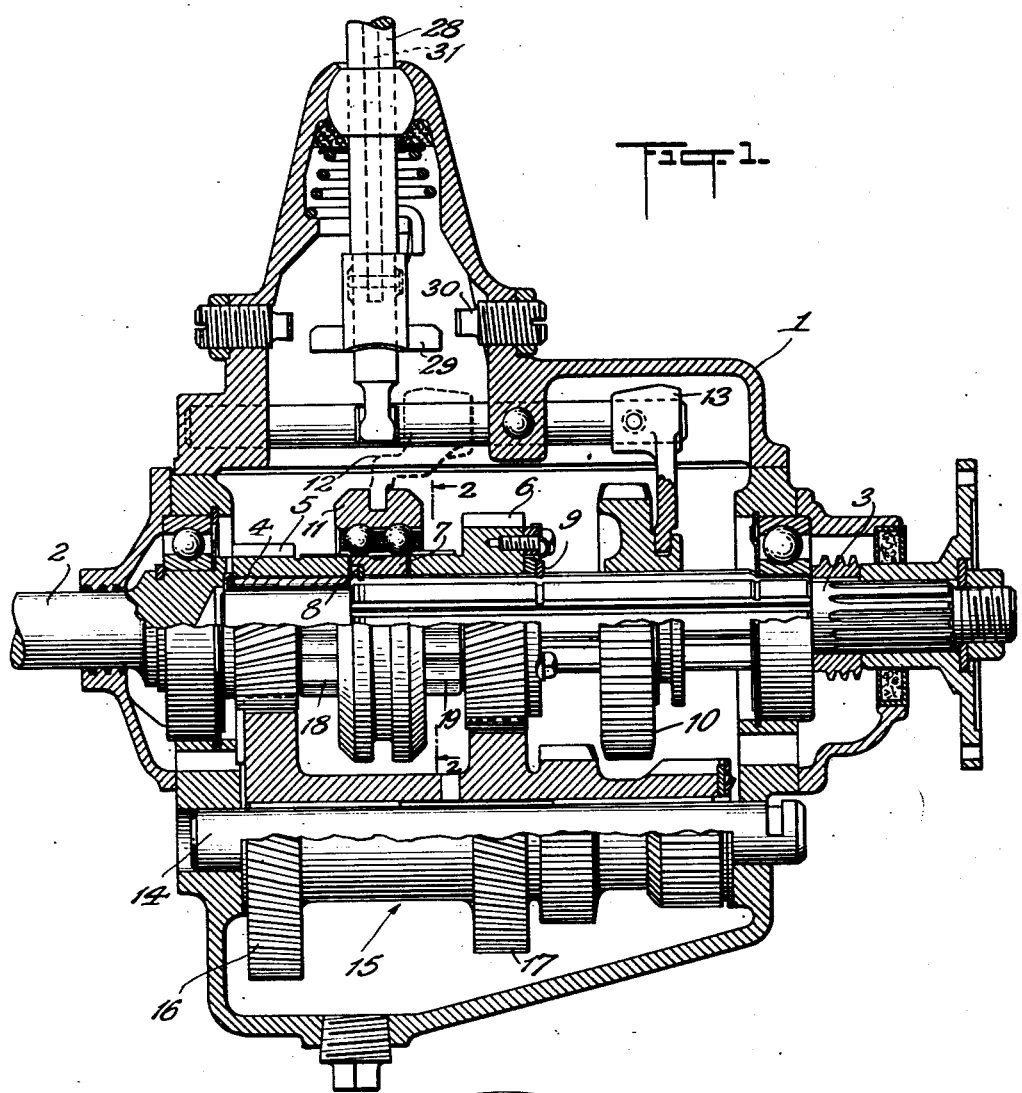
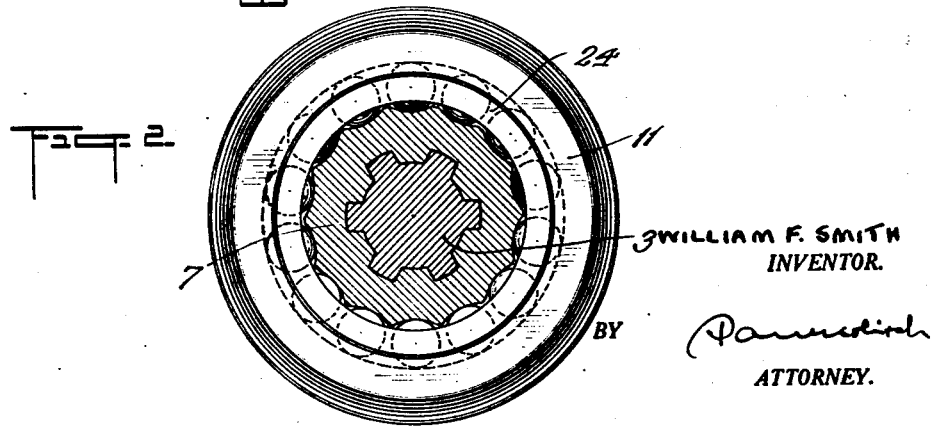
WILLIAM F. SMITH
INVENTOR.
BY
ATTORNEY.

Jan. 9, 1934.  W. F. SMITH  1,942,669
FREE WHEELING TRANSMISSION CLUTCH
Filed Aug. 24, 1931  3 Sheets-Sheet 2
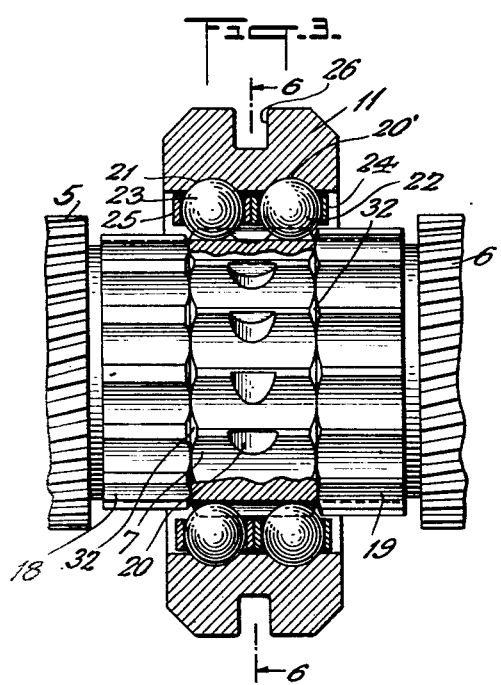
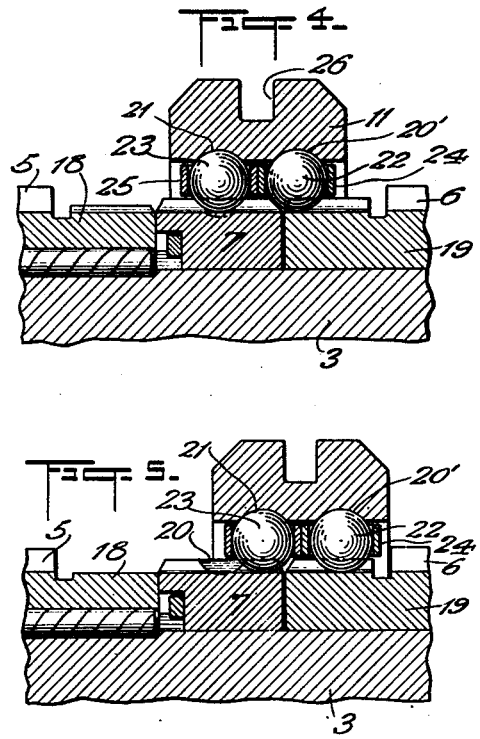
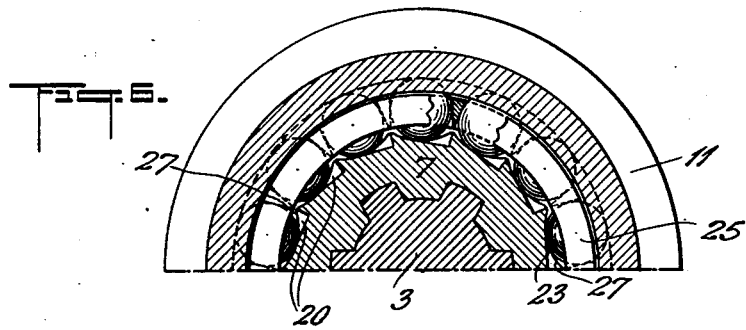
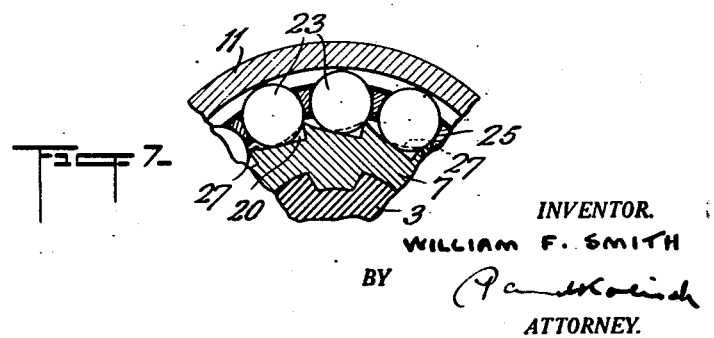
INVENTOR.
WILLIAM F. SMITH
BY
ATTORNEY.

Jan. 9, 1934.  W. F. SMITH  1,942,669
FREE WHEELING TRANSMISSION CLUTCH
Filed Aug. 24, 1931   3 Sheets-Sheet 3
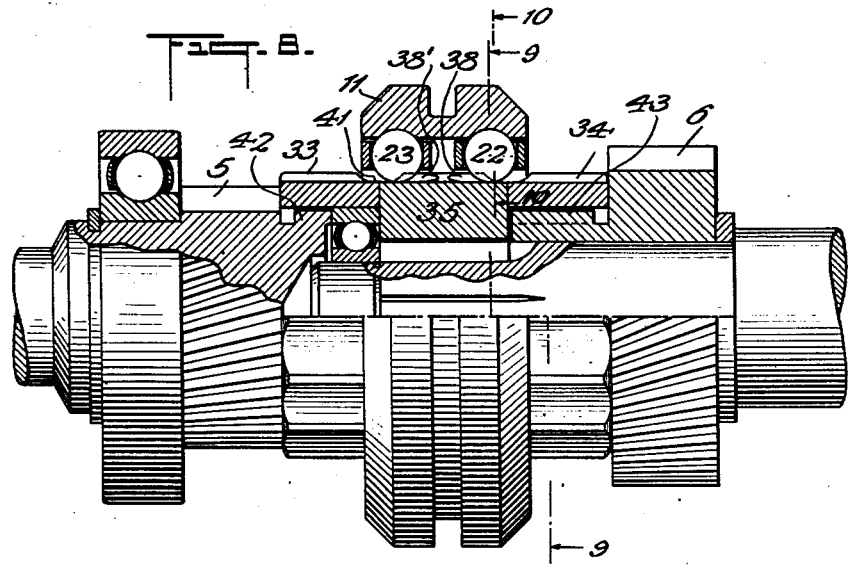
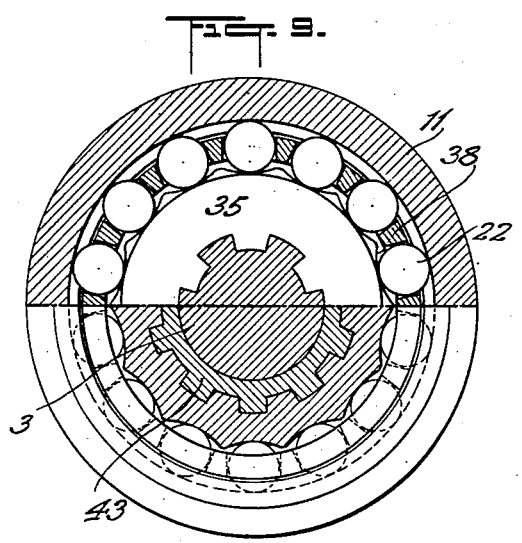
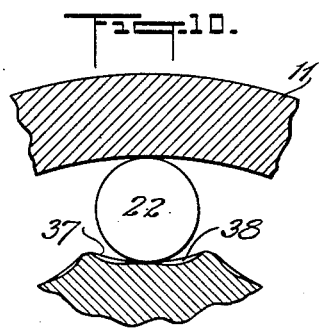
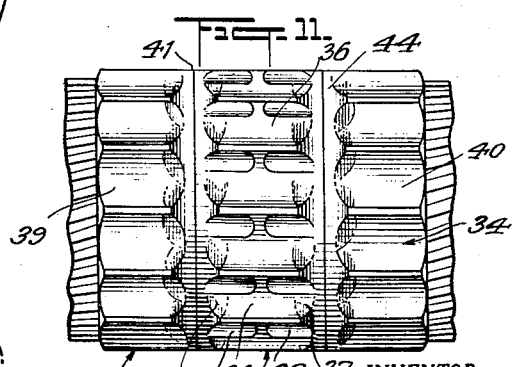
INVENTOR.
WILLIAM F. SMITH
BY
ATTORNEY.

Patented Jan. 9, 1934

1,942,669

UNITED STATES PATENT OFFICE

1,942,669

FREE WHEELING TRANSMISSION CLUTCH

William F. Smith, Poughkeepsie, N. Y.

Application August 24, 1931. Serial No. 558,998

8 Claims. (Cl. 192—48)

This invention relates to automobile transmission clutches of the free wheeling type.

In many cases it is desirable that an automobile be provided with means for permitting the car to coast under its own momentum, the engine being disengaged from the rear wheels, so that no braking action is created by engine compression. This result may be obtained by providing a one-way or overrunning clutch inside of the transmission housing. It is advantageous to arrange the clutch so that it disengages on all forward speeds when the car's momentum tends to drive the engine, for with the clutch so operated there can be no sudden retardation of the progress of the car along the road by the braking effect created by the engine upon closing of the throttle. As a high torque has to be transmitted when the engine is carrying the car load, the clutch must be strongly built, although its size is necessarily limited by the available space within the transmission housing. Furthermore, the device should be noiseless in operation.

Clutches are known in the prior art which utilize a pair of concentric relatively rotatable members which have rolling surfaces and are adapted to be locked against relative rotation by means of one or several rollers placed between the adjacent rolling surfaces of the two members. This type of prior art device is open to the objection that only a narrow line of contact is obtained between the roller and the inner one of the clutch members, with the result that high pressures are developed which tend to distort the operating parts and reduce the load carrying capacity of them. Where several rollers are provided side by side for producing the locking effect, great difficulty is encountered in causing them to divide the load equally. If one roller is slightly oversize it takes substantially the entire force upon itself with the result that the working life of the device is shortened prejudicially. From this follows that extreme accuracy is required in the making of a clutch structure of the multiple roller type. Because of the fact that the distance between the bearing surfaces of contiguous rollers is so small the material of the race members cannot deflect sufficiently locally to insure seating of all of the rollers, unless they are ground to extremely close limits.

It is, therefore, an object of my invention to provide an improved form of free wheeling transmission which embodies an extremely simple yet strong and compact one-way or overrunning clutch which is so constructed that it may readily be locked so as to transmit power in either direction, to the exclusion of the overrunning feature.

Another feature of my invention is the provision of a clutch of this type which is adapted to be shifted readily even while carrying a load.

In accordance with my invention I provide a transmission wherein the speed reducing gears are constantly in mesh and are brought into play through the agency of slidable locking members which serve to key the driving shaft to any preselected set of gears. This clutch mechanism comprises a plurality of grooved or fluted internal clutch members positioned side by side in coaxial alignment and surrounded by a race member having a plurality of laterally spaced grooves for receiving balls or other roller elements. These balls are adapted to rest between the grooves and the flutes of the internal clutch members. By sliding the external race longitudinally with respect to the internal clutch members one row of balls may be brought into engagement with one clutch member while the other row of balls is in engagement with a second clutch member, so that a driving connection is obtained. By making the radius of curvature of the flutes large and by properly selecting the size of the balls and spacing between the bottom of the flutes and the grooves in the race, it may be insured that the balls will be jammed between the inner clutch member and outer race member and be held locked against rotation, so that the fluted clutch member and race turn together as one unit, with respect to the direction of rotation of either of them. Where a relatively large number of flutes are provided in the periphery of the inner clutch member the driving force is distributed over a relatively large number of balls with a resulting increase in capacity and life of the clutch. Long life and high carrying capacity of the device is likewise insured by providing a plurality of balls, which are seated in flutes, and are spaced from one another by an appreciable distance, whereby the outer race is permitted to deform locally sufficiently to insure that each ball will carry its proportional part of the load, even if the balls are of slightly different diameters.

By utilizing balls as the locking members, easy shifting of the race from locked to unlocked position is insured. When the race is moved axially from one position to another, the balls roll along the flutes or grooves in the inner race members and allow easy shifting even when power is being transmitted through the clutch. Tapered pockets or depressions are provided in the bottom of the flutes to receive the balls when one internal clutch member is rotated with respect to the race in a predetermined direction. These pockets increase in depth from one end to the other in a direction around the periphery of a clutch member, i. e., at right angles to the flutes, so that if the clutch member rotates in one direction the balls are rolled to the shallow end of the pockets and into contact with the groove in the race so that a driving connection is obtained, but on the other hand if the clutch member is rotated in the opposite direction, the balls are rolled into the deep ends of the pockets and out of contact with the grooved surface. In this position the balls cannot assume the locking position and one member of the clutch may overrun the other.

In the drawings, Fig. 1 is a side elevation view in section of a transmission embodying my invention.

Fig. 2 is an end view partly in section on line 2—2 of Fig. 1 of the ball clutch forming part of the transmission shown in Fig. 1.

Fig. 3 is an enlarged sectional view in side elevation of a portion of the transmission showing the ball clutch in neutral position.

Fig. 4 is a view similar to Fig. 3 except that the ball clutch is shifted to the right to engage the second gear and operate in overrunning or free wheeling manner.

Fig. 5 is a view similar to Fig. 3 except that the ball clutch is shifted to engage the second gear in locked position so as to drive in either direction.

Fig. 6 is a sectional view taken along line 6—6 of Fig. 3 and shows the balls in the driving position which they assume when the engine tends to turn faster than the drive shaft of the rear wheels.

Fig. 7 is a view similar to Fig. 6 except that the balls are shown in the free wheeling or overrunning position which they assume when the main drive shaft of the rear wheels turns faster than the engine.

Fig. 8 is a side elevation view partly in section of a modified form of ball clutch mechanism constructed in accordance with my invention.

Fig. 9 is a sectional view taken along line 9—9 of Fig. 8.

Fig. 10 is an enlarged fragmentary sectional view taken along line 10—10 of Fig. 8.

Fig. 11 is a side elevation view of the three fluted inner clutch members of the device shown in Fig. 8.

Fig. 12 is a fragmentary view showing the several positions which the balls assume during a shifting operation.

Referring more particularly to Fig. 1, reference numeral 1 indicates a housing having rotatably supported therein at one end, an engine drive shaft 2, and at the other end thereof a main propeller shaft 3 adapted to be connected to the driving wheels of an automobile. One end of the propeller shaft 3 is rotatably supported within a pocket 4, formed in a gear 5 fixed to the end of engine shaft 2. The propeller shaft 3 is splined to receive a fluted clutch member or race 7 and has rotatably mounted upon it a second gear 6. The clutch member and gear are positioned side by side and are prevented from longitudinal movement by means of rings 8 and 9 which fit within grooves in the periphery of the propeller shaft. The low gear 10 is slidably positioned on the propeller shaft and splined thereto in the usual manner. A ball race or ring clutch member 11 is slidably mounted on the clutch member 7 and forks 12 and 13 are provided for shifting the gear 10 and the race 11 in the usual manner. A conventional counter shaft 14 is fixed to the housing 1 and has journaled thereon a gear cluster 15 of which gear element 16 constantly meshes with main gear 5 and gear element 17 constantly meshes with second gear 6.

Gears 5 and 6 have formed integral with them fluted inner clutch members or races 18 and 19 respectively, which are similar in construction and have the same number of flutes. The main clutch member 7, which is attached to the propeller shaft, is also fluted in the same manner as 18 and 19, but has in addition a series of depressions or pockets 20 located along the center line of its periphery. One of these pockets is located at one side of each flute and is tapered gradually so as to increase in depth from the center of the flute to the edge thereof, the deeper edge of the pocket being on the side of the flute opposite to the direction in which the clutch member rotates when power is being transmitted from the engine shaft through the mechanism to drive the automobile ahead. The race 11 is similar to an ordinary double row ball bearing race and has a pair of circular grooves 20' and 21 therein for receiving rows of balls 22 and 23. Each row has a sufficient number of balls so that one is seated in each of the flutes of member 7, and these balls are held in spaced relationship by means of retainers 24 and 25 having holes within which the balls fit snugly, but in freely rotatable fashion. The race 11 has a groove 26 for receiving a shifting fork whereby the race may be shifted longitudinally to any desired position, as shown in Figs. 4 and 5.

The clutch members 7, 18, 19 and 11 are made of chrome, carbon, steel or other alloy ordinarily used in constructing ball races, which is both wear resisting and resilient. The radius of curvature of flutes 27 is made relatively large so that when the outer race member is turned relative to the main clutch member 7 the balls 22 and 23 are jammed between the curved surface of the flutes, and the grooves in the race 11, in locking position, with the result that the race and clutch member turn together as a unit. On the other hand, the depth of the pockets 20 is such that if the race 11 is in the position shown in Fig. 4 and the main clutch member 7 is rotated in a counterclockwise direction with respect to race 11 as shown in Fig. 7, the balls 23 drop down within the pockets 20 and no longer engage the race 11, so the clutch member can rotate freely with respect to the race. The ends of the flutes in the clutch members are chamfered as shown at 32 to permit easy entry of the balls 22, 23 during the shifting operation.

One set of dimensions which have been found practicable are as follows:

| | Inches |
|---|---|
| Radius of inner clutch member at bottom of flutes | 1.203 |
| Radius of flutes | ¾ |
| Diameter of balls | ⅟₁₆ |
| Inner diameter of retainer | 2.702 |
| Outer diameter of retainer | 3.343 |
| Retainer having 14 holes diameter | .563 to .565 |

*Operation*

When the engine shaft 2 is rotating, gear 6 is driven through the agency of main gear 5 and gears 16 and 17 of cluster 15. If it is desired to drive the propeller shaft 3 through the second gear, the gear shift lever 28 is moved sidewise and forward in the usual manner so as to engage the shift fork 12 and move the race 11 in a right hand direction, as viewed in Figs. 1, 3, 4 and 5. This lever is thrust forward until the finger 29 fixed to the end of the shift lever, engages with abutment screw 30 fixed to the housing. When this occurs the race 11 occupies the position shown in Fig. 4 with the row of balls 22 positioned in the flutes of clutch member 19 and the row of balls 23 located at the center line of clutch member 7. This arrangement of parts insures that when the gear 6 tends to rotate faster than the clutch member 7 a driving connection will be obtained. The clutch member 19 turns with respect to the race 11 far enough to jam the balls 22 between the flutes and the groove so that the balls are unable to rotate, and so being locked the race 11 and ring 19 turn together as a unit. The same action occurs between the race, the balls 23 and clutch member 7 with the result that the balls 23 are likewise jammed in locking position, as shown in Fig. 6, so that clutch member 19, race 11 and clutch member 7 all move together without relative rotation. On the other hand when the propeller shaft 3 and clutch member 7 tend to turn faster than gear 6 the clutch member 7 moves ahead of the balls in a counterclockwise direction as viewed in Figs. 6 and 7, whereupon the balls assume the position shown in Fig. 7 and rest in the pockets 20 out of locking engagement with the race 11. The clutch is now overrunning and the transmission is therefore now free wheeling, the engine being permitted to drive the car ahead but the car being permitted to run freely with respect to the engine when the momentum of the car tends to move it faster than the engine would drive it.

In order to lock the engine shaft to the rear wheels so that the free wheeling action is prevented and the engine can act as a brake on the progress of the car, it is merely necessary to depress the control rod 31 of shift lever 28 by means of a button, not shown, so as to move the finger 29 downward out of the path of abutment screw 30. The lever 28 can then be moved ahead far enough to carry shift fork 12 and race 11 in a right hand direction to the position shown in Fig. 5. When this occurs the balls 22 are moved farther to the right in the flutes of clutch member 19 and balls 23 are moved to the right hand end of the flutes in clutch member 7, out of alignment with the pockets 20 so that upon relative rotation in either direction of clutch member 7 with respect to 19, the balls 22 and 23 are jammed in locking position and a fixed driving connection is obtained, as illustrated in Figs. 5 and 6.

A shift to high gear is accomplished by moving the race 11 in a left hand direction, as viewed in Figs. 1, 3, 4 and 5, so that the balls 23 engage the flutes of clutch member 18. The operation is exactly the same as that already described and so further discussion seems unnecessary. It will be noted that the race may be moved to either a free wheeling or locking position just as when it is in cooperation with clutch member 19. The result is that the engine shaft 2 is coupled with the propeller shaft 3 through clutch member 18, balls 23, race 11, balls 22 and clutch member 7.

When the race is shifted to bring the balls into engagement with one of the clutch members 18 or 19, the load is not instantaneously taken up by the clutch but there is a slippage for an interval of time sufficient for the balls to jam tightly into locking position; this time interval is short but is sufficient smoothly to accelerate the load. Probably the time interval is that necessary to break down the oil film between the balls and raceway.

By utilizing a relatively large number of balls, the crushing force on each, when a driving connection is obtained, is kept relatively small. The race 11 being of resilient alloy steel deforms sufficiently under load to insure an even distribution of pressure among the balls even when they are of slightly different diameters. A further factor contributing to the long life and high carrying capacity is the fact that the groove in race 11 and the grooves or flutes of clutch members 7, 18 and 19 curve in opposite directions with respect to the grooves in the race 11, so that more than a point or line of contact is obtained. As the curvature of the flutes is in the same direction as that of the balls, a relatively wide bearing surface is obtained between them, as distinguished from that which results when the curvature of the body with which the ball contacts is opposite to that of the ball. The ball retainers 24 and 25 also increase the load carrying capacity and durability of the mechanism by insuring substantially simultaneous seating of all of the balls when the parts are shifted from one driving position to another. If one ball happens to be slightly larger than another or tends to move angularly into locking position more quickly than its neighbors for any reason, it will carry with it the retainer into which it fits snugly, and consequently move all of the balls into a similar locking position at the same time. This feature prevents any one ball from momentarily carrying all of the load.

The design of the several parts of this clutch mechanism is such that they may be easily constructed without the use of specially constructed machinery. The outer race 11 is the same as that used in conventional double row ball bearing units and the balls may be selected and matched as to size in the usual manner, common in the ball bearing art. The flutes of the inner clutch members 7, 18 and 19 may be ground to the proper radius accurately by the use of ordinary grinding wheels. The depth of the pockets 20 is not material as long as the balls, when in the position shown in Fig. 7, are free from the race and so the pockets may be easily made by a grinding or milling operation.

The entire resulting structure is small in size and serves not only as an overrunning clutch or free wheeling device but also as a sliding key or locking unit whereby one of several gear ratios or driving connections may be obtained at will without sliding gears.

Rollers might be used in place of the balls but balls are preferable as they permit easy shifting of the race longitudinally from one position to another even when load is being transmitted. The retarding force results from rolling friction rather than sliding friction and so is relatively small.

The balls 22 and 23 should fit within the grooves 20' and 21 more snugly than is the ordinary practice in constructing ball bearings, so that a greater bearing surface will be obtained between the balls and the race.

It will be noted that with any device of the type already described in connection with Figs. 1 to 7, when the race is shifted to cause a driving connection from the engine shaft to the propeller shaft, it first passes to the overrunning or free wheeling position and then must be moved another step to the locking position. Two motions are required, one to move the shift lever 28 and the other to depress the rod 31 in order to shift the gear connections so that a two-way driving action is obtained. The structure shown in Fig. 1 for accomplishing this result is merely illustrative and other mechanisms for performing the two motions might obviously be used.

In the modified form of device shown in Figs. 8 to 12, the ordinary shifting motion moves the race into a fully locked position, whereby driving connection in either direction is obtained. A further motion corresponding to that which may be obtained in the device of Fig. 1 by depressing the rod 31, results in moving the race to the overrunning or free wheeling position.

In Figs. 8 to 12, reference numerals 33 and 34 represent fluted clutch members corresponding to 18 and 19 of Fig. 1, and 35 indicates a main clutch member corresponding to 7 of Fig. 1. The outer race 11 is the same as that already described. Clutch member 35 is symmetrical around its center line as shown most clearly in Fig. 11. Along the center of the periphery of this member are flutes or grooves 36 which terminate at each end in inclined or chamfered entrance faces 37 provided to permit the easy entry of the balls in the flutes during shifting operation. Symmetrically located on each side of the center line are overrunning or free wheel pockets or depressions 38 and 38'. The two clutch members 33 and 34 are similar in construction, having flutes 39 and 40 respectively, as well as inclined entrance faces 44.

Operation

The position occupied by the race 11 when the transmission is in neutral is that shown in Fig. 8. In this position the balls 22 and 23 rest in the free wheel pockets 38 and 38' and no driving action is obtained between clutch member 35 and either of members 33 and 34. Assuming that the transmission has been in second gear, and it is desired to shift into high gear, the gear shift lever (not shown but similar to that of Fig. 1) is moved from the second to the high gear position in one movement in the conventional manner, as in an ordinary transmission. The result of this movement is that the race slides out of engagement with the second gear to the neutral position shown in Fig. 8, then as the motion is continued the balls 23 move into the track 41 formed by adjoining portions of clutch members 33 and 35. In this position the balls 23 are free to rotate between the track 41 and the groove in the race 11 just as they are in an ordinary ball bearing. Then as the shifting motion continues the race moves further in a left hand direction and as a result of this motion, the balls 22 gradually move out of the free wheel pockets 38 in a locking position with race 11 and tend to bring the race to the speed of clutch member 35, which is being driven through the propeller shaft by the rear wheels. This action occurs before the balls 23 engage with the flutes of clutch member 33, with the result that the race 11 is accelerated gradually without any sudden shock. Further movement of the race results in the balls 22 entering the flutes 36 at the center line of clutch member 35, out of engagement with the free wheeling pockets and the balls 23 fully engaging in flutes 39. In this position of the parts, a fully locked condition is obtained with the result that power may be transmitted in either direction through the clutch. A further movement of the race 11 to the left, which may be brought about by depressing the rod 31, which is shown in Fig. 1, results in the balls 22 moving into the free wheel pockets 38' while the balls 23 still remain in engagement with the flutes 39 of member 33.

The same action results when it is desired to shift to second gear, in which case the race member is moved in a right hand direction. Fig. 12 shows the several positions of the balls 22 and 23 during the shifting operation into second gear. The full line position is that occupied by the balls when transmission is in neutral, no driving connection being had between the driving and driven shafts. The dot position shows the balls in fully locked driving position which they assume as a result of an ordinary shifting operation of the gear shift lever. The dot-dash position is that taken by the balls after the gear shift lever has been moved an additional distance by pressing the lever 31. This is the free wheel position in which the balls 22 engage with the flutes of clutch member 34 while the balls 23 occupy the free wheel pockets 38 in the clutch member 35.

This modified form of clutch mechanism has the advantage that it permits the transmission to be used primarily as an ordinary transmission, by shifting in the ordinary manner, and as a free wheeling transmission only by releasing a lock to permit a movement in addition to the ordinary or standard movement. This is an aid to safe shifting while descending a hill, where it is desired, for example, to shift from high gear to second gear to obtain an added engine breaking effect. The transmission shifts from either a fully locked or free wheel high gear position to a fully locked second gear position without the added step of passing through the free wheel second gear position.

Either of the modifications shown in Figs. 1 to 8 occupy but little space either in length or diameter, and so may be placed within the transmission housing. Because of the relatively short overall length of the device, the bearings of the transmission shafts may be kept close together so that shaft deflection is minimized. Another feature is that the clutch performs not only the function of a free wheeling unit but also that of sliding keys, which are necessary for the operation of a constant mesh transmission.

For convenience in manufacturing, the clutch members 33 and 34 are not formed integrally with the gears 5 and 6 but are splined to hubs 42 and 43 respectively of these gears. The inclined entrance faces 37 and 44 of the clutch members are not absolutely essential and may be omitted. They are desirable, however, as they permit the balls to be moved partially into the flutes before any pressure is applied between the balls and the race.

I have described two embodiments of my invention merely for the purpose of illustration and it should be understood that various modifications and adaptations thereof may be made within the scope of the invention as expressed in the appended claims.

What I claim is:

1. An automobile clutch comprising a drive shaft, a driven shaft in alignment therewith, a clutch member having axially aligned grooves in the periphery thereof attached to each of said shafts, an outer double ball race encircling one of said clutch members, a plurality of locking balls positioned between said grooves and said race, the grooves of one of said members being furnished with transverse pockets having one end deeper than the other, for receiving said balls when said race is in a predetermined position longitudinally of said member and means for moving said race and balls longitudinally of said one of said clutch members into engagement with the other thereof, the distance between said clutch members being less than the length of said race, and the shape of said grooves being such that said balls are jammed against said race in locking position when one of said clutch members is rotated relative to the other.

2. An automobile clutch comprising a pair of fluted clutch members positioned side by side in axial alignment, means for driving one of said members, an outer race encircling one of said clutch members, means for moving said race longitudinally with respect to said clutch members, a section of the flutes of one of said clutch members being made deeper at one side than at the other so that when said rolling members are in the deep end of said section they are out of engagement with said race and rolling elements positioned between said race and the flutes of said clutch members.

3. A clutch mechanism for automobile transmission comprising three fluted clutch members of equal diameter arranged side by side in axial alignment, a race surrounding said fluted members and adapted for moving longitudinally thereof, said race having a pair of grooves therein, a plurality of balls arranged between the flutes of said three fluted members and said grooves, the middle one of said fluted members being provided with inclined depressions intermediate the ends thereof, and means for moving said race longitudinally of said fluted members so that one row of balls will engage one of said fluted members and the other row will engage another of said fluted members.

4. A device in accordance with claim 3 characterized by a drive shaft connected to one of said fluted members, a driven shaft connected to the middle one of said fluted members, and a reducing gear connected to the third of said fluted members.

5. A device in accordance with claim 3 wherein the ends of said flutes are chamfered to permit easy entry of said balls.

6. A clutch device comprising a pair of fluted members arranged side by side in axial alignment, a double groove race surrounding said fluted members, the width between the grooves in said race being not greater than the width of one of said fluted members but greater than the distance between the two, a plurality of balls positioned between said grooves and the flutes of said members, means for moving said race longitudinally of said fluted members, each of the flutes of one of said fluted members being provided with a transversely disposed tapered pocket of such size that a ball when in the deep end thereof is free from engagement with said race, the longitudinal position of said pocket being such that when one groove of the race is over said pocket, the other of said grooves is over the other of said fluted members.

7. A clutch mechanism for automobile transmission comprising three fluted clutch members of equal diameter arranged side by side in axial alignment, a race member surrounding said fluted members and adapted for movement longitudinally thereof, said race member having a pair of grooves therein, a plurality of balls arranged between the flutes of said fluted members and said grooves, the radius of curvature of said flutes being such as to lock said balls against said race and prevent rotation thereof when said race is turned with respect to said fluted members, and means active when said race is in one of said longitudinal positions for preventing one of said rows of balls from locking.

8. An automobile clutch comprising two fluted clutch members positioned side by side, the flutes of a first one of said members having free wheel pockets in one end thereof, and a double groove ball race encircling said first member and adapted for movement toward the other member.

WILLIAM F. SMITH.